(12) United States Patent
Lee

(10) Patent No.: US 12,249,078 B2
(45) Date of Patent: Mar. 11, 2025

(54) SYSTEM AND METHOD FOR TRACKING CREATURE BODY

(71) Applicant: PEGATRON CORPORATION, Taipei (TW)

(72) Inventor: Yi-Huan Lee, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 410 days.

(21) Appl. No.: 17/591,989

(22) Filed: Feb. 3, 2022

(65) Prior Publication Data

US 2022/0335621 A1 Oct. 20, 2022

(30) Foreign Application Priority Data

Apr. 15, 2021 (TW) .................................. 110113572

(51) Int. Cl.
*G06T 7/20* (2017.01)
*G01S 13/58* (2006.01)
*G06F 16/583* (2019.01)

(52) U.S. Cl.
CPC ............... *G06T 7/20* (2013.01); *G01S 13/58* (2013.01); *G06F 16/583* (2019.01); *G06T 2207/30241* (2013.01)

(58) Field of Classification Search
CPC ............ G06T 7/20; G06T 2207/30241; G06T 2207/20084; G06T 2207/30196; G06T 2207/30221; G06T 7/246; G01S 13/58; G01S 7/412; G01S 13/867; G01S 13/89; G01S 13/003; G06F 16/583; G06V 10/62; G06V 10/778; G06V 20/52; G06V 40/103; G06N 3/08

See application file for complete search history.

(56) References Cited

U.S. PATENT DOCUMENTS

2014/0107842 A1* 4/2014 Yoon ..................... G06V 40/23
382/103
2020/0364882 A1* 11/2020 Feng ......................... G06T 7/70
(Continued)

FOREIGN PATENT DOCUMENTS

CN 108510062 A 9/2018
CN 109447053 A 3/2019

*Primary Examiner* — Xuemei G Chen
*Assistant Examiner* — Han Hoang
(74) *Attorney, Agent, or Firm* — Muncy, Geissler, Olds & Lowe, P.C.

(57) ABSTRACT

The present invention provides a system for tracking a creature body. The system includes an image capturing device, a radio frequency transceiver device, and a computing device. The image capturing device is configured to capture an image of a target creature. The radio frequency transceiver device is configured to transmit a radio signal to the target creature and receive a plurality of reflected signals from the target creature. The computing device includes an image tracking module, a creature feature value database, and a comparison module. The image tracking module is configured to track the target creature according to the captured image, and the comparison module is configured to compare the reflected signals with the creature feature value, to find out a registered identity of the target creature, so that the image tracking module keeps tracking the target creature. The present invention also provides a method for tracking a creature body.

15 Claims, 6 Drawing Sheets

(56) References Cited

U.S. PATENT DOCUMENTS

2021/0287381 A1\* 9/2021 Wang .................... G06T 7/73
2022/0185267 A1\* 6/2022 Beller ............... B60W 30/0956
2022/0334243 A1\* 10/2022 DeAngelus .......... G06V 10/454

\* cited by examiner

SYSTEM AND METHOD FOR TRACKING CREATURE BODY

CROSS REFERENCE TO RELATED APPLICATIONS

This Non-provisional application claims priority under 35 U.S.C. § 119(a) on Patent Application No(s). 110113572 filed in Taiwan, Republic of China on Apr. 15, 2021, the entire contents of which are hereby incorporated by reference.

BACKGROUND

Technical Field

The present invention provides a system and method for tracking a creature body, and in particular, to a person that confirms an identity of a creature by using a radio signal.

Description of Related Art

Current camera devices have high resolution, and software or algorithms for image recognition can be used to recognize faces and human bodies in real time, thereby automatically tracking a specific target person or confirming an identity of the specific target person.

However, the target person cannot continue to be tracked by means of image recognition when temporarily out of the shooting range of the camera device or shielded. For example, during a ball game, the camera automatically tracks and photographs a star player by means of image recognition, but when the star player overlaps with other players, the camera is prone to tracking errors.

SUMMARY

In view of the above, the inventor is devoted to research to develop a system and method for tracking a creature body, so as to increase the success rate of tracking the target creature.

A first implementation of the present invention provides a system for tracking a creature body. The system includes an image capturing device, a radio frequency transceiver device, and a computing device. The image capturing device is configured to capture an image of a target creature. The radio frequency transceiver device is configured to transmit a radio signal to the target creature and receive a plurality of reflected signals from the target creature.

The computing device is electrically connected to the radio frequency transceiver device and the image capturing device. The computing device includes an image tracking module, a creature feature value database, and a comparison module. The image tracking module is configured to track the target creature according to the image captured by the image capturing device. The creature feature value database has a plurality of pieces of creature feature value. Each creature feature value corresponds to a registered identity. The comparison module is configured to compare the reflected signals with the plurality of creature feature values in the creature feature value database, to find out a registered identity of the target creature, so that the image tracking module keeps tracking the target creature.

A second implementation of the present invention provides a method for tracking a creature body, in which a target creature is tracked by the system for tracking a creature body, the method including the following steps:

(1) capturing, by an image capturing device, an image of a target creature;
(2) transmitting, by a radio frequency transceiver device, a radio signal to the target creature, and receiving reflected signals from the target creature;
(3) tracking, by an image tracking module, the target creature according to the image captured by the image capturing device; and
(4) comparing, by a comparison module, the reflected signals with creature feature values in the creature feature value database, to find out a registered identity of the target creature.

In an embodiment, the method further includes: determining whether the target creature is shielded in the image, if not, tracking, by the image tracking module, the target creature according to the image captured by the image capturing device, and if so, predicting, by a trajectory prediction module, a moving trajectory of the target creature.

In an embodiment, the computing device further includes the trajectory prediction module. The trajectory prediction module is configured to predict a moving trajectory of the target creature when the target creature is shielded, and keep tracking the target creature according to a comparison result of the reflected signals with the creature feature values.

In an embodiment, the moving trajectory of the target creature that is predicted by the trajectory prediction module is a predetermined position of the target creature when being shielded that is obtained by calculating a speed of the target creature according to the image captured by the image capturing device and estimating the predetermined position according to a last position of the target creature before being shielded.

In an embodiment, the trajectory prediction module further enlarges the predetermined position into an enlarged prediction range.

In an embodiment, the radio frequency transceiver device is provided with a plurality of transmitting antennas for transmitting the radio signal and a plurality of receiving antennas for receiving the reflected signals.

In an embodiment, the comparison module is configured to compare the reflected signals with creature feature values in terms of a similarity of the creature body, to find out the registered identity of the target creature.

In an embodiment, the comparison module is configured to: compare the reflected signals with the creature feature values in terms of a feature point array, and when a distance ratio of a plurality of sets of feature points corresponding to the reflected signals from the target creature approximates a distance ratio of a plurality of sets of feature points corresponding to one of the creature feature values, determine that the registered identity of the target creature is found.

In an embodiment, the creature feature value corresponding to the registered identity of the target creature is established by a deep learning system. The deep learning system includes a learning device, an image capturing device for learning electrically connected to the learning device, and a radio frequency transceiver device for learning. The learning device has a deep learning model. The radio frequency transceiver device for learning is configured to transmit a radio signal to the target creature and receive reflected signals. The image capturing device for learning is configured to capture an image of the target creature. The deep learning model is configured to perform deep learning according to the reflected signals and the image, to establish a creature feature value of the target creature, so as to register the registered identity of the target creature and the corresponding creature feature values in the creature feature value database.

In an embodiment, the comparison module is further configured to establish the reflected signals of the target creature as to-be-confirmed feature value data when failing to find out the registered identity of the target creature, and the computing device further includes a to-be-confirmed feature value database for storing the to-be-confirmed feature value data.

In an embodiment, the radio signal transmitted by the radio frequency transceiver device conform to 5G to 10G wireless network specifications.

In an embodiment, the image capturing device is an RGB camera or a depth camera.

In this way, according to the system and method for tracking a creature body of the present invention, the identity of the target creature is identified by using the radio signal, so that the image capturing device can keep tracking the target creature, thereby effectively improving the success rate of tracking the target creature.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION

Figure 1:
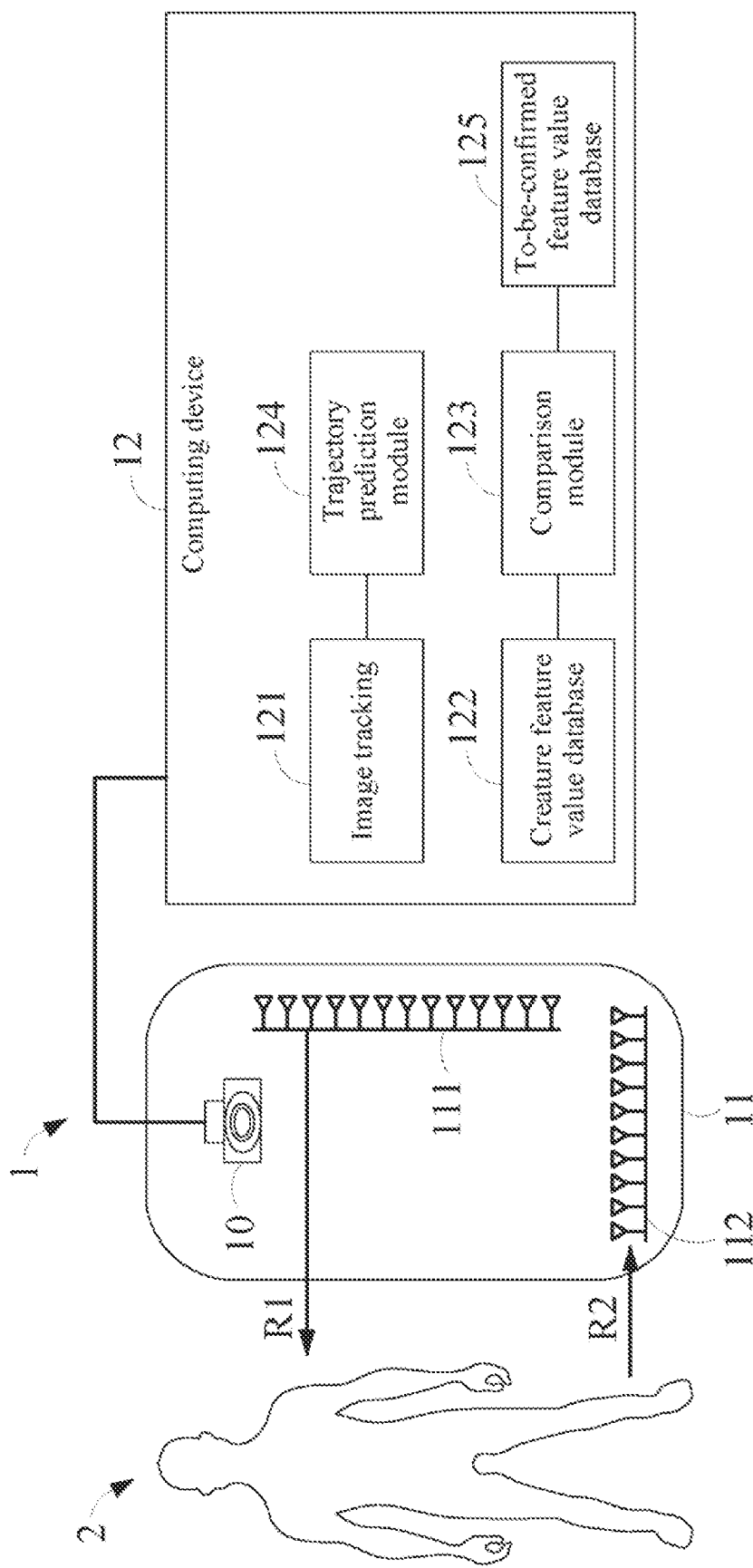
FIG. 1 is a schematic diagram of a system for tracking a creature body and a target creature according to a specific embodiment of the present invention.

To fully understand the objectives, features and functions of the present invention, the present invention is described in detail by using the following specific embodiments with reference to the accompanying drawings. The description is as follows:

Referring to FIG. 1, a first implementation of the present invention provides a system 1 for tracking a creature body. The system includes an image capturing device 10, a radio frequency transceiver device 11, and a computing device 12. The image capturing device 10 is configured to capture an image of a target creature 2. The radio frequency transceiver device 11 is configured to transmit a radio signal R1 to the target creature 2, and receive reflected signals R2 from the target creature 2. The computing device 12 is electrically connected to the radio frequency transceiver device 11 and an image capturing device 10. The computing device 12 includes an image tracking module 121, a creature feature value database 122, and a comparison module 123. The image tracking module 121 is configured to track the target creature 2 according to the image captured by the image capturing device 10. The creature feature value database 122 includes at least one registered identity and a plurality of creature feature values. The comparison module 123 is configured to compare feature values of the reflected signals R2 with a plurality of creature feature values in the creature feature value database, to find out a registered identity of the target creature 2, so that the image tracking module 10 keeps tracking the target creature 2.

The radio frequency transceiver device 11 is provided with a plurality of transmitting antennas 110 for transmitting the radio signal R1 and a plurality of receiving antennas 111 for receiving the reflected signals R2. The image capturing device 11 may be an RGB camera or a depth RGB camera, but the present invention is not limited thereto. The radio signal transmitted by the radio frequency transceiver device 11 conforms to 5G to 10G wireless network specifications, or may be other radio signals capable of penetration. The computing device 12 may be a personal computer, a notebook computer, an industrial computer, or other electronic devices having computing capabilities.

Figure 2:
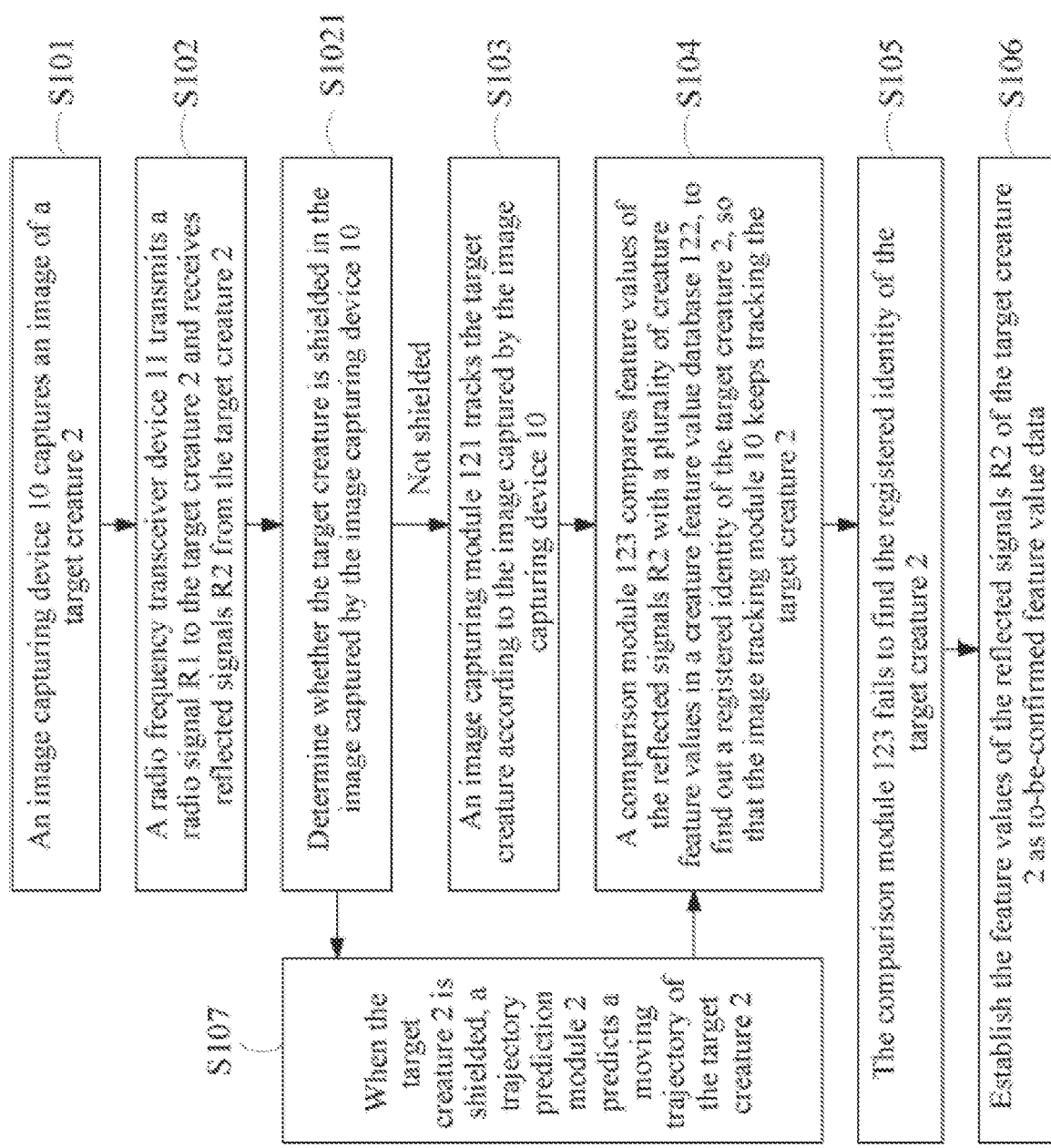
FIG. 2 is a schematic flowchart of a method for tracking a creature body according to a specific embodiment of the present invention.

Referring to FIG. 1 and FIG. 2, a second implementation of the present invention provides a method for tracking a creature body. The method includes the following steps:

Step S101: An image capturing device 10 captures an image of a target creature 2.

Step S102: A radio frequency transceiver device 11 transmits a radio signal R1 to the target creature 2, and receives reflected signals R2 from the target creature 2.

Step S103: An image tracking module 121 tracks the target creature according to the image captured by the image capturing device 10.

Step S104: A comparison module 123 compares feature values of the reflected signals R2 with a plurality of creature feature values in a creature feature value database 122, to find out a registered identity of the target creature 2, so that the image tracking module 121 keeps tracking the target creature 2.

Step S105: The comparison module 123 fails to find the registered identity of the target creature 2. If the target creature 2 has not first established the creature feature values and the registered identity in the feature value database 122, the comparison module 123 will not be able to find the creature feature values and the registered identity of the target creature 2. However, it is also possible that after the target creature 2 establishes the creature feature values and the registered identity in the feature value database 122, the creature body has changed. When the comparison module 123 fails to find out the registered identity of the target creature 2, the image tracking module 121 may keep tracking the target creature 2 by means of image recognition. Alternatively, due to lack of confirmation of the target creature 2 by the comparison module 123 and interference from other creatures or obstacles around the target creature 2, the tracking fails.

Step S106: Establish the feature values of the reflected signal R2 of the target creature 2 as to-be-confirmed feature value data. When the tracking of the target creature 2 fails due to failing to find out the registered identity of the target creature 2 by the comparison module 123, the feature values of reflected signals R2 of the target creature 2 are established as the to-be-confirmed feature value data. The computing device 12 may further include a to-be-confirmed feature value database 125 for storing the to-be-confirmed feature value data. A user can view data in the to-be-confirmed feature value database 125 as a reference for adjusting the feature value database 122. For example, the target creature 2 is confirmed as a new individual, and a new creature feature value and registered identity are established, or the creature feature values of the target creature 2 that are stored in the creature feature value database 122 are updated.

In this way, according to the system 1 and method for tracking a creature body of the present invention, the identity of the target creature is identified by using the radio signal, so that the image capturing device 10 can keep tracking the target creature 2, thereby effectively improving the success rate of tracking the target creature 2.

Figure 3:
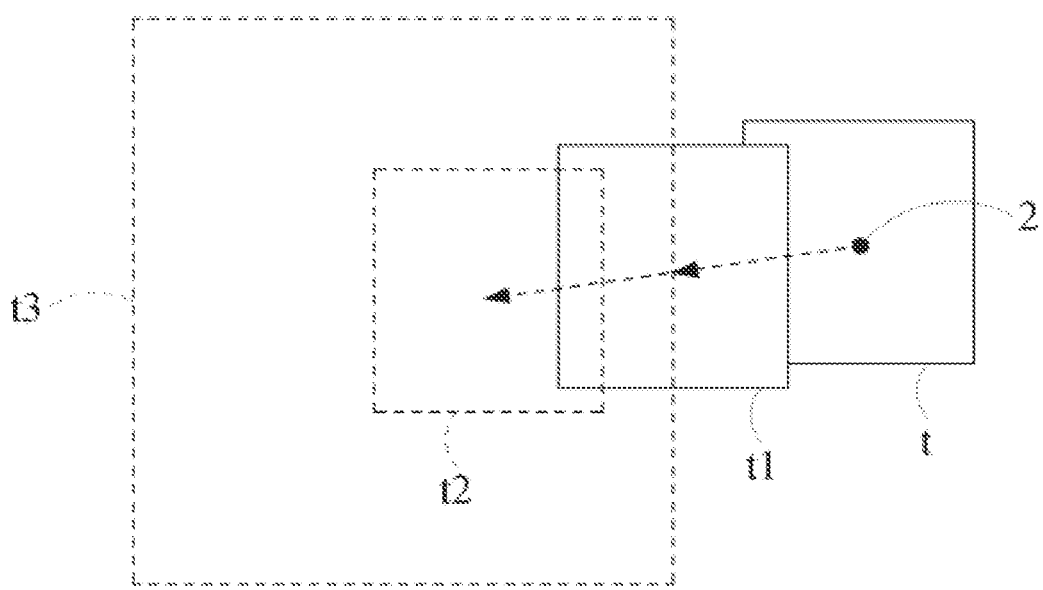
FIG. 3 is a schematic diagram of tracking a track of a target creature according to a specific embodiment of the present invention.

As shown in FIG. 1 to FIG. 3, in an embodiment, the computing device 12 further includes the trajectory prediction module 124. The trajectory prediction module 124 is configured to predict a moving trajectory of the target creature 2 when the target creature 2 is shielded, and keep tracking the target creature 2 according to a comparison result of the reflected signals R2 with the creature feature values. Specifically, the trajectory prediction module 124 can calculate a speed of the target creature 2 according to the image captured by the image capturing device 10. When the target creature 2 is temporarily shielded and fails to capture the image, the moving trajectory is estimated by using an algorithm. The moving trajectory of the target creature 2 that is predicted by the trajectory prediction module 124 is a predetermined position of the target creature 2 when being shielded that is obtained by calculating a speed of the target creature 2 according to the image captured by the image capturing device 10 and estimating the predetermined position according to a last position of the target creature 2 before being shielded. For example, the target creature 2 starts to be shielded after moving from a position t to a position t1, but a predetermined position t2 of the target creature when shielded can be estimated. In this way, the success rate of tracking is increased by enlarging an enlarged prediction range t3 to the predetermined position. The trajectory prediction module 124 may be a programming language or software having a built-in algorithm. After the trajectory prediction module 124 is added, the method for tracking a creature body of the present invention further includes the following steps.

Step S1021: Determine whether the target creature is shielded in the image captured by the image capturing device 10, if the target creature is not shielded, perform step S103 in which the image tracking module 10 keeps tracking the target creature 2, and if the target creature is shielded, perform step S107.

Step S107: When the target creature 2 is shielded, a trajectory prediction module 124 predicts a moving trajectory of the target creature 2, and keeps tracking the target creature 2 according to a comparison result of the reflected signals R2 with the creature feature values in step S104.

As shown in FIG. 1, in an embodiment, the comparison module 123 may be a programming language or software having a built-in algorithm, and is configured to compare the reflected signal R2 from the target creature 2 with a plurality of creature feature values in terms of a creature body and a feature point array.

Figure 4:
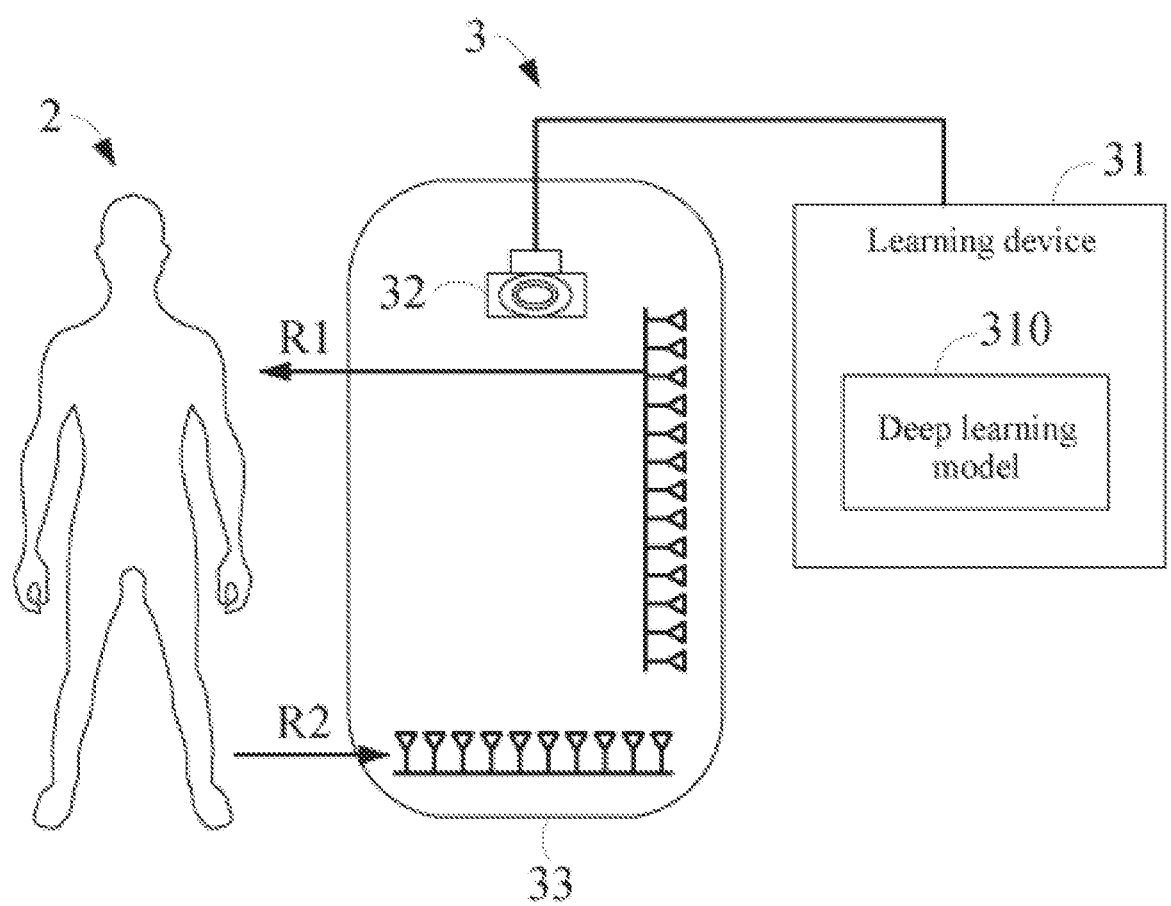
FIG. 4 is a schematic diagram of a deep learning system and training of a target creature according to a specific embodiment of the present invention.
Figure 6:
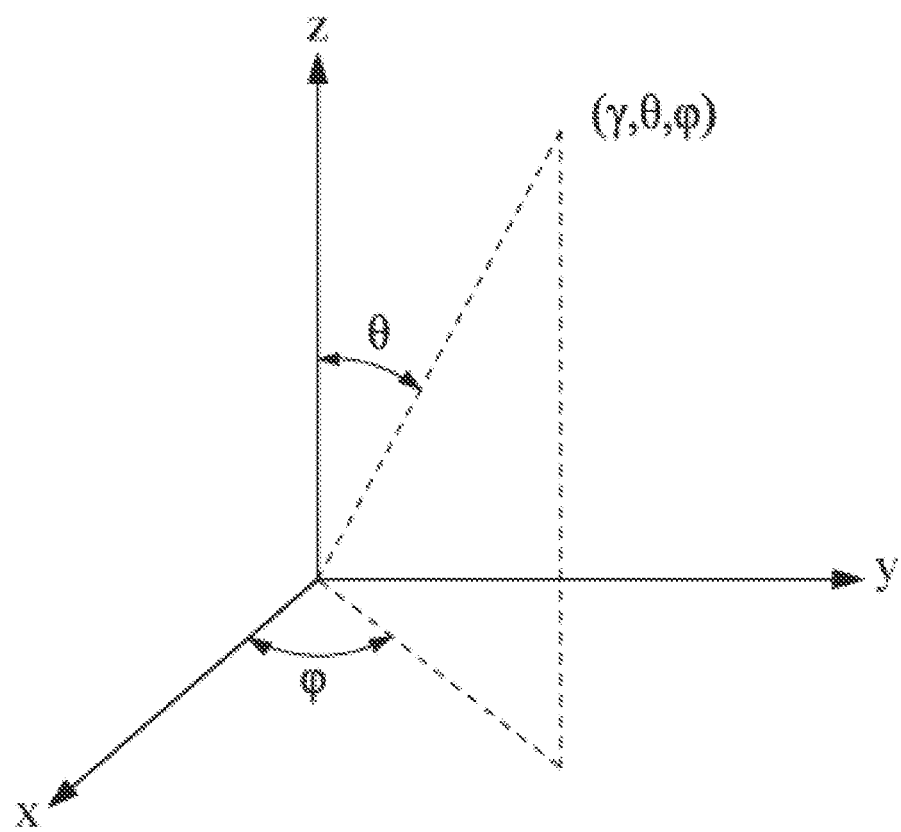
FIG. 6 is a schematic diagram of three-dimensional spherical coordinates according to a specific embodiment of the present invention.

As shown in FIG. 4 and FIG. 6, in an embodiment, the creature feature value corresponding to the registered identity of the target creature 2 may be established by a deep learning system 3. The deep learning system 3 includes a learning device 31, an image capturing device 32 for learning electrically connected to the learning device 31, and a radio frequency transceiver device 33 for learning. The learning device 31 has a deep learning model 310. The radio frequency transceiver device 33 for learning is configured to transmit a radio signal R1 to the target creature 2, and receive the reflected signals R2. The image capturing device 32 for learning is configured to capture an image of the target creature 2. The deep learning model 310 is configured to perform deep learning according to the reflected signals R2 and the captured images at the same time, to establish a plurality of creature feature values of the target creature 2, and register the target creature 2 as the registered identity. Specifically, the image capturing device 32 for learning can provide the deep learning model 310 with the plurality of feature points of a planar image of the target creature 2, for example, in the form of coordinates in the ".json" format. In FIG. 6, when the target creature 2 is a person, a total of 25 feature points P0 to P24 can be obtained by means of manual marking or image recognition. The format of the reflected signal R2 provided by the radio frequency transceiver device 33 for learning to the deep learning model 310 may be three-dimensional spherical coordinates $(r, \theta, \psi)$ of a spherical coordinate system in the ".csv" format. Each spherical coordinate $(r, \theta, \psi)$ can record the intensity of the received reflected signal R2 time by time. The deep learning model 310 may repeatedly train creature feature values 50 corresponding to the plurality of feature points P0 to P24 after decoding the plurality of feature points of the planar image continuously provided by the image capturing device 32 for learning and the reflected signals R2 continuously provided by the radio frequency transceiver device 33. For example, a feature point array corresponding to the reflected signals of the plurality of feature points is trained by using the successive 10 sets of reflected signals R2. The plurality of creature feature values 50 may include a feature point array formed by the reflected signals of the feature points P0 to P24 and a creature body formed by the plurality of feature points P0 to P24. The image capturing device 32 for learning may be similar to the image capturing device of FIG. 1. The radio frequency transceiver device 33 for learning may be similar to the radio frequency transceiver device 11 of FIG. 1. The learning device 31 may be similar to the computing device 12 of FIG. 1. The deep learning model 310 may be an artificial intelligence programming language or software installed in the learning device 31. The deep learning model 310 can register the registered identity and the corresponding creature feature values of the target creature 2 in the creature feature value database 122 of FIG. 1 after establishing the creature feature value and the registered identity of the target creature 2.

Figure 5:
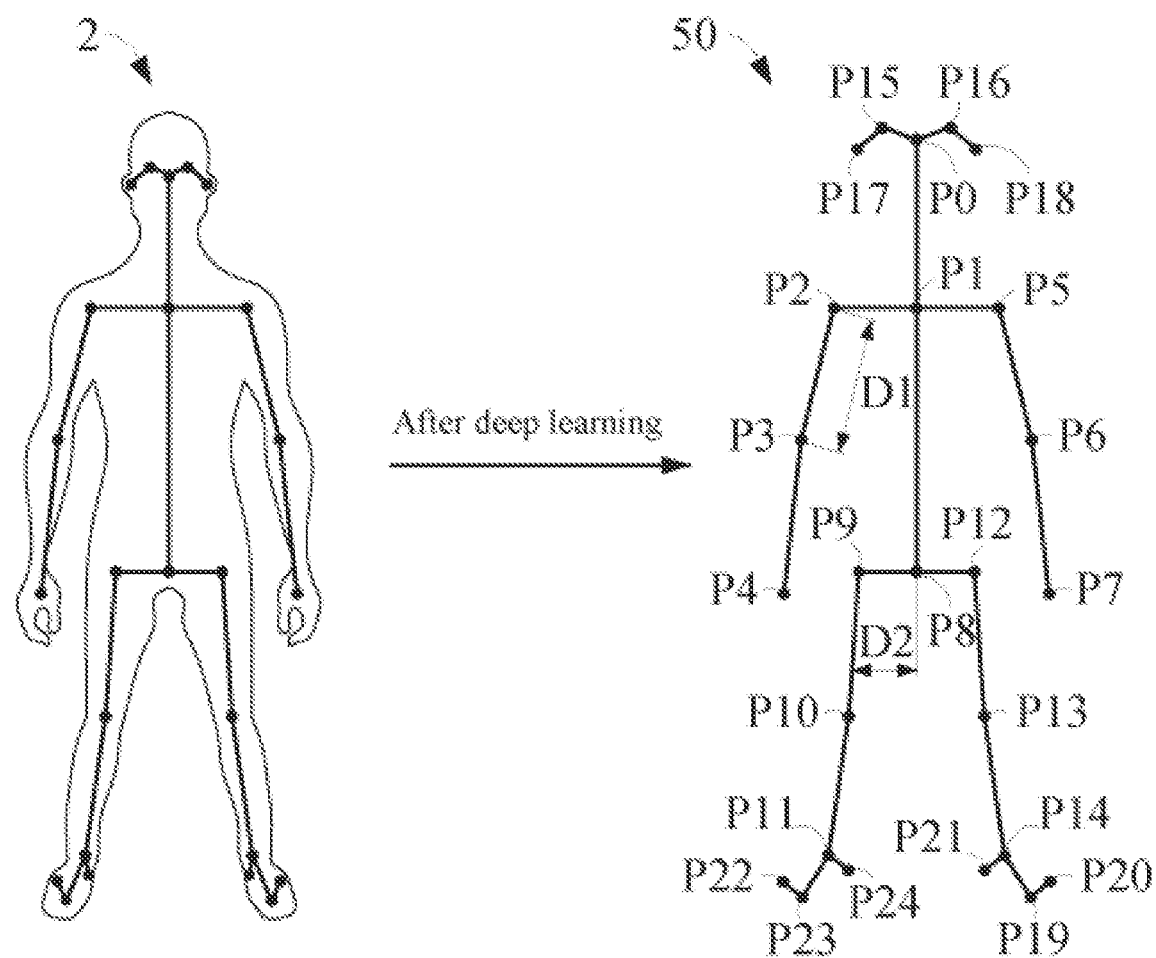
FIG. 5 is a schematic diagram of establishing creature feature values of a target creature according to a specific embodiment of the present invention.

As shown in FIG. 1 and FIG. 5, in an embodiment, when the creature feature value database 122 stores the creature feature values after the deep learning, the creature feature values can be used to identify the identity of the target creature 2. The comparison module 123 can compare the creature body reflected by the reflected signals R2 with the creature body having the creature feature values 50 stored in the creature feature value database 122. When the similarity is greater than a threshold, it is determined that the target creature 2 is the registered identity registered for the creature feature values 50. In addition, the comparison module 123 may also compare the reflected signals R2 with the creature feature values in terms of a feature point array. When a ratio of a plurality of feature lengths of the feature point array formed by the reflected signals R2 from the target creature 2 approximates a ratio of a plurality of feature lengths corresponding to the creature feature values of the registered identity, it may be determined that the registered identity of the target creature 2 is found, for example, a ratio of a feature length D1 between a feature point 2 and a feature point 3 to a feature length D2 between a feature point 8 and a feature point 9. When the ratio of the plurality of feature lengths corresponding to the reflected signals R2 of the target creature 2 approximates the ratio of the plurality of feature lengths corresponding to the creature feature values 50, it can be determined that the target creature 2 is the registered identity registered for the creature feature values 50.

The system and method for tracking a creature body of the present invention can be applicable to a large number of aspects, for example, a case that many players wear the same uniform during sports games, and tracking errors often occur in the tracking method of image recognition. However, the radio signal can reflect the unique body of each player, to assist the camera in targeting a certain target player. Even if the target player is temporarily shielded, tracking can also be continuously performed by means of trajectory prediction and the radio signal. For another example, if robots that assist in carrying luggage at an airport has a built-in system for tracking a creature body of the present invention, even if someone temporarily passes between the robots, the robots still follow the employer. In addition to tracking human figures, the system and method for tracking a creature body of the present invention is also applicable to animal photographing, livestock management, and the like.

The above descriptions are merely preferred embodiments of the present invention. However, for a person skilled in the art, the embodiments are only used to describe the present invention, and are not intended to limit the present invention. It should be noted that all variations and substitutions equivalent to this embodiment should be considered to be included in the scope of the present invention. Therefore, the protection scope of the present invention shall be subject to those defined in the claims.

What is claimed is:

1. A system for tracking a creature body, the system comprising:
    an image capturing device, configured to capture an image of a target creature;
    a radio frequency transceiver device, configured to transmit a radio signal to the target creature and receive a plurality of reflected signals from the target creature; and
    a computing device, electrically connected to the radio frequency transceiver device and the image capturing device and comprising an image tracking module, a creature feature value database, and a comparison module, wherein the image tracking module is configured to track the target creature according to the image captured by the image capturing device, the creature feature value database comprises at least one registered identity and a plurality of creature feature values, the registered identity corresponds to at least one creature feature value, and the comparison module is configured to compare the reflected signals with the creature feature values in the creature feature value database, to find out a registered identity of the target creature, so that the image tracking module keeps tracking the target creature,
    wherein the target creature comprises a plurality of feature points, the reflected signals comprise the plurality of creature feature values corresponding to the feature points, the creature feature values of the reflected signals comprise a feature point array formed by the reflected signals and the creature body formed by the feature points,
    wherein the comparison module is configured to: compare the creature feature values of the reflected signals with the creature feature values of the creature feature value database in terms of the feature point array, and when a distance ratio of a plurality of sets of feature points corresponding to the creature feature values of the reflected signals from the target creature approximates a distance ratio of a plurality of sets of feature points corresponding to the creature feature values of the registered identity, determine that the registered identity of the target creature is found.

2. The system for tracking a creature body according to claim 1, wherein the computing device further comprises a trajectory prediction module, and the trajectory prediction module is configured to predict a moving trajectory of the target creature when the target creature is shielded, and keep tracking the target creature according to a comparison result of the reflected signals and the creature feature values.

3. The system for tracking a creature body according to claim 2, wherein the moving trajectory of the target creature that is predicted by the trajectory prediction module is a predetermined position of the target creature when being shielded that is obtained by calculating a speed of the target creature according to the image captured by the image capturing device and estimating the predetermined position according to a last position of the target creature before being shielded.

4. The system for tracking a creature body according to claim 3, wherein the trajectory prediction module further enlarges the predetermined position into an enlarged prediction range.

5. The system for tracking a creature body according to claim 1, wherein the radio frequency transceiver device is provided with a plurality of transmitting antennas for transmitting the radio signal and a plurality of receiving antennas for receiving the reflected signals.

6. The system for tracking a creature body according to claim 1, wherein the comparison module is configured to compare the reflected signals with the creature feature values in terms of a creature body, to find out the registered identity of the target creature.

7. The system for tracking a creature body according to claim 1, wherein the creature feature values corresponding to the registered identity of the target creature are established by a deep learning system, the deep learning system comprises a learning device, an image capturing device for learning electrically connected to the learning device, and a radio frequency transceiver device for learning, the learning device has a deep learning model, the radio frequency transceiver device for learning is configured to transmit the radio signal to the target creature and receive the reflected signals, the image capturing device for learning is configured to capture an image of the target creature, and the deep learning model is configured to perform deep learning according to the reflected signals and the image to establish creature feature values of the target creature, so as to register the registered identity of the target creature and the corresponding creature feature values in the creature feature value database.

8. The system for tracking a creature body according to claim 7, wherein the deep learning model is configured to perform deep learning training on a plurality of feature points obtained from the image and the reflected signals corresponding to the feature points, so as to establish the creature feature values and the registered identity of the target creature.

9. The system for tracking a creature body according to claim 1, wherein the comparison module is further configured to establish the reflected signals of the target creature as to-be-confirmed feature value data when failing to find out the registered identity of the target creature, and the computing device further comprises a to-be-confirmed feature value database for storing the to-be-confirmed feature value data.

10. The system for tracking a creature body according to claim 1, wherein the radio signal transmitted by the radio frequency transceiver device conforms to 5G to 10G wireless network specifications.

11. The system for tracking a creature body according to claim 1, wherein the image capturing device is an RGB camera or a depth camera.

12. A method for tracking a creature body, in which a target creature is tracked by the system having a creature feature value database, the method comprising the following steps:
- capturing an image of the target creature;
- transmitting a radio signal to the target creature, and receiving reflected signals from the target creature;
- tracking the target creature according to the image of the target creature; and
- comparing the reflected signals with creature feature values in the creature feature value database, to find out a registered identity of the target creature,
- wherein the target creature comprises a plurality of feature points, the reflected signals comprise the plurality of creature feature values corresponding to the feature points, the creature feature values of the reflected signals comprise a feature point array formed by the reflected signals and the creature body formed by the feature points,
- wherein the creature feature values of the reflected signals are compared with the creature feature values of the creature feature value database in terms of the feature point array, and when a distance ratio of a plurality of sets of feature points corresponding to the creature feature values of the reflected signals from the target creature approximates a distance ratio of a plurality of sets of feature points corresponding to the creature feature values of the registered identity, determine that the registered identity of the target creature is found.

13. The method for tracking a creature body according to claim 12, wherein the reflected signals are compared with the creature feature values in terms of a creature body, to find out the registered identity of the target creature.

14. A method for tracking a creature body, in which a target creature is tracked by the system having a creature feature value database, the method comprising the following steps:
- capturing an image of the target creature;
- transmitting a radio signal to the target creature, and receiving reflected signals from the target creature;
- determining whether the target creature is shielded in the image, if not, tracking, by the image tracking module, the target creature according to the image captured by the image capturing device, and if so, predicting, by the trajectory prediction module, a moving trajectory of the target creature; and
- comparing the reflected signals with the plurality of creature feature values in the creature feature value database, to find out a registered identity of the target creature,
- wherein the target creature comprises a plurality of feature points, the reflected signals comprise the plurality of creature feature values corresponding to the feature points, the creature feature values of the reflected signals comprise a feature point array formed by the reflected signals and the creature body formed by the feature points,
- wherein the creature feature values of the reflected signals are compared with the creature feature values of the creature feature value database in terms of the feature point array, and when a distance ratio of a plurality of sets of feature points corresponding to the creature feature values of the reflected signals from the target creature approximates a distance ratio of a plurality of sets of feature points corresponding to the creature feature values of the registered identity, determine that the registered identity of the target creature is found.

15. The method for tracking a creature body according to claim 14, wherein the target creature that is predicted is a predetermined position of the target creature when being shielded that is obtained by calculating a speed of the target creature according to the image of the target creature and estimating the predetermined position according to a last position of the target creature before being shielded.

\* \* \* \* \*